US 9,736,191 B2

(12) United States Patent
Pison et al.

(10) Patent No.: US 9,736,191 B2
(45) Date of Patent: Aug. 15, 2017

(54) DIGITAL RADIO-COMMUNICATION SYSTEM FOR CHANGING A NARROW-BAND INFRASTRUCTURE AND TERMINALS INTO A WIDE-BAND INFRASTRUCTURE AND TERMINALS

(75) Inventors: Laurent Pison, Jouars Pontchartrain (FR); Olivier Paterour, Guyancourt (FR)

(73) Assignee: AIRBUS DS SAS, Elancourt (FR)

( * ) Notice: Subject to any disclaimer, the term of this patent is extended or adjusted under 35 U.S.C. 154(b) by 207 days.

(21) Appl. No.: 14/350,200

(22) PCT Filed: Aug. 24, 2012

(86) PCT No.: PCT/EP2012/003586
§ 371 (c)(1),
(2), (4) Date: Apr. 7, 2014

(87) PCT Pub. No.: WO2013/053414
PCT Pub. Date: Apr. 18, 2013

(65) Prior Publication Data
US 2014/0241306 A1    Aug. 28, 2014

Related U.S. Application Data

(60) Provisional application No. 61/546,222, filed on Oct. 12, 2011.

(51) Int. Cl.
*H04W 76/02* (2009.01)
*H04L 29/06* (2006.01)
(Continued)

(52) U.S. Cl.
CPC ...... *H04L 65/1016* (2013.01); *H04L 12/6418* (2013.01); *H04L 69/16* (2013.01);
(Continued)

(58) Field of Classification Search
CPC ..................................................... H04W 76/02
See application file for complete search history.

(56) References Cited

U.S. PATENT DOCUMENTS

2002/0196781 A1* 12/2002 Salovuori ............. H04W 88/16
370/352
2009/0215411 A1* 8/2009 Tucker .................. H04W 4/10
455/90.2

(Continued)

FOREIGN PATENT DOCUMENTS

EP            2259658          12/2010

OTHER PUBLICATIONS

International Search Report for Int. App. No. PCT/EP2012/003586, completed May 8, 2013.
(Continued)

*Primary Examiner* — Robert M Morlan
*Assistant Examiner* — Nourali Mansoury
(74) *Attorney, Agent, or Firm* — Pillsbury Winthrop Shaw Pittman LLP

(57) ABSTRACT

The invention relates to a radio-communication system for Push-to-Talk applications, comprising: a narrow-band PMR-technology terminal capable of connecting, via a radio-electric interface, to a narrow-band network infrastructure for accessing, via a PTT server, a set of narrow-band PTT resources or applications; and a wide-band-technology terminal capable of connecting, via a radio-electric interface, to an IP-WAN network for accessing, via a server, a set of wide-band PTT resources or applications, wherein said terminal comprises a client PTT application on the IP-WAN network configured to establish an IP connection between the terminal and a PTT server over the IP-WAN via an interface, such that said terminal can access the (Continued)

narrow-band PTT resources or applications and establish a communication channel with the terminal.

6 Claims, 10 Drawing Sheets

(51) Int. Cl.
*H04W 4/10* (2009.01)
*H04L 12/64* (2006.01)
*H04W 4/16* (2009.01)
*H04W 48/18* (2009.01)
*H04W 84/08* (2009.01)

(52) U.S. Cl.
CPC ............... *H04W 4/10* (2013.01); *H04W 4/16* (2013.01); *H04W 48/18* (2013.01); *H04W 76/02* (2013.01); *H04W 84/08* (2013.01)

(56) References Cited

U.S. PATENT DOCUMENTS

| | | | |
|---|---|---|---|
| 2009/0239527 A1 | 9/2009 | Forsten et al. | |
| 2012/0149421 A1* | 6/2012 | Korus | H04W 4/10 455/518 |
| 2013/0029714 A1* | 1/2013 | Koren | H04W 4/10 455/518 |

OTHER PUBLICATIONS

Durantini, et al., "Integration of Broadband Wireless Technologies and PMR Systems for Professional Communications," ICNS 2008. Fourth International Conference on Networking and Services, 2008, IEEE, Mar. 16, 2008, pp. 84-89.

\* cited by examiner

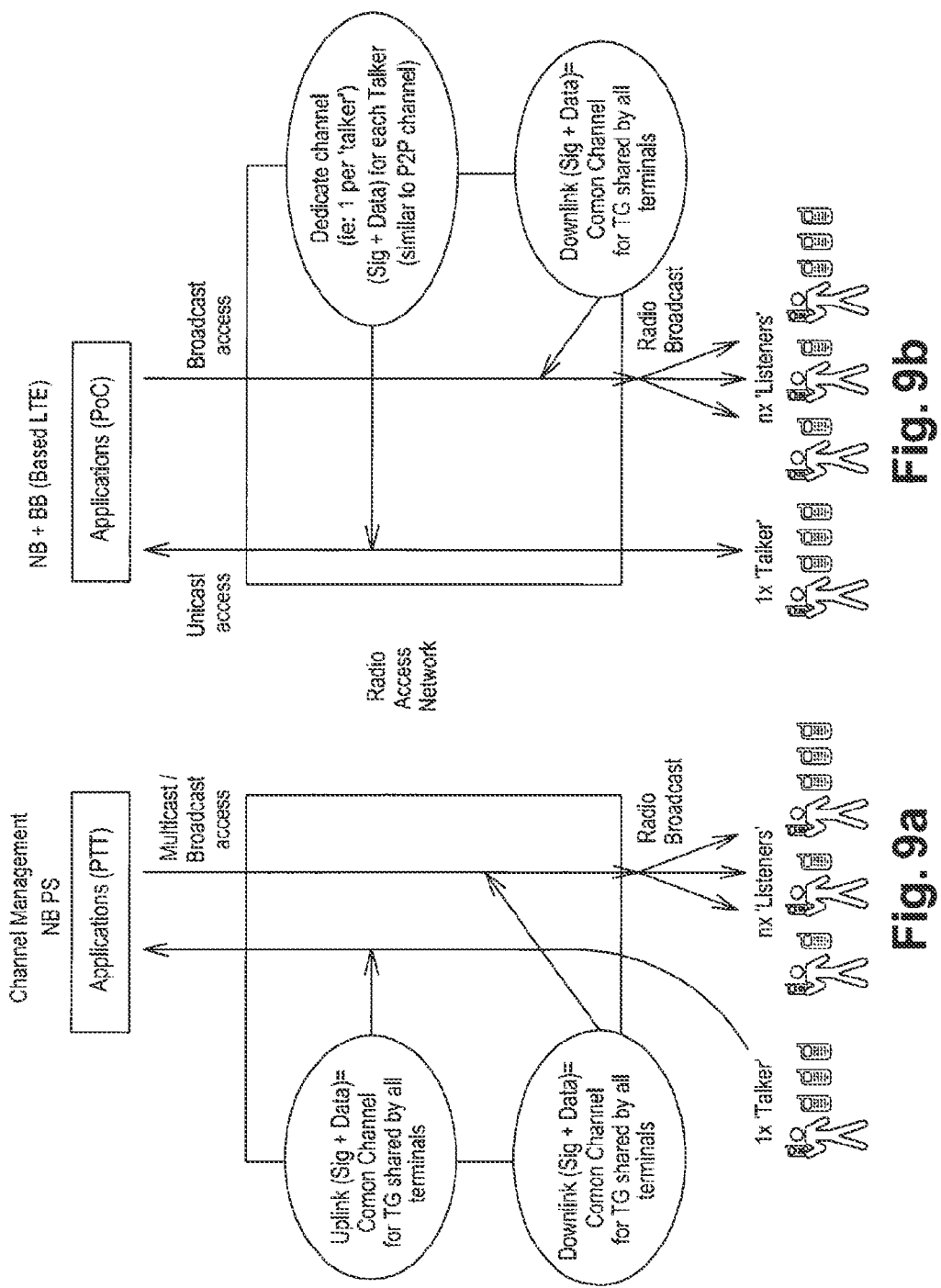

DIGITAL RADIO-COMMUNICATION SYSTEM FOR CHANGING A NARROW-BAND INFRASTRUCTURE AND TERMINALS INTO A WIDE-BAND INFRASTRUCTURE AND TERMINALS

CROSS REFERENCE TO RELATED APPLICATIONS

The present application is a U.S. National Phase Application pursuant to 35 U.S.C. §371 of International Application No. PCT/EP2012/003586 filed Aug. 24, 2012, which claims priority to U.S. Provisional patent application No. 61/546,222 filed Oct. 12, 2011. The entire disclosure contents of these applications are herewith incorporated by reference into the present application.

FIELD OF THE INVENTION

This invention relates to the field of private mobile digital radio communication systems. It can be used for beneficial applications especially in professional radio communication private systems. (or PMR system, for Professional Mobile Radio in English).

According to the radio communication system, this invention aims to provide the establishment of a communication link between multiple terminals from Push To Talk type (or PTT) to narrow band with terminals from PTT type to broad band.

BACKGROUND

In the field of private mobile digital radio communication systems hereinafter called PMR system, there are a range of mobile terminals using a communication method so called PTT (for Push To Talk, or Press To Transmit). This communication method is made on a half-duplex link and based on pressing a button to switch or select the PMR terminal from a receiver report to a data transmitter report such as voice, especially, but more generally data of all kinds. Half-duplex link means a communication channel enhancing the data transport in both directions, but not simultaneously, in other words up-link (up-link in English) or in down-link (or down-link in English).

Push To Talk communication method is a voice over IP (for Internet Protocol) implemented in real-time Packet Data Networks. In other ways, a PTT terminal ensures a direct communication by pressing a button and establishes a link with a different terminal or multiple terminals.

The diagrams 1a-1c are the illustrations of a radio communication system 100 which are generally utilised for PTT terminals 110. In this radio communication system 100, a radio mobile PTT terminal 110 is typically interfaced to a network infrastructure 120 via multiple base stations 130 which are associated to site controller 135.

This network infrastructure 120 has one or more routing subsystems 140 which also known as regional networks. A routing subsystem 140 is considered to be the smallest subsystem that can provide PMR services 160 via an IP network 165. Each subsystem 140 has a switch which also called PTT server 150 has ability to manage the mobility of PTT terminals 110 on the network and to ensure the communication between PTT terminals 110 of that network. The PTT server 150 is also capable to be interfaced with one or more other PTT server 150, in order to ensure the multiple networking subsystems 140 between them and can cover a wide geographic area.

However, the current radio communication infrastructures in PTT technology are planned for terminals 110 which are operating on dial-up is known as narrowband (or Narrow Band in English). In other words, PMR services 160 may be accessible only for dial-up applications, or the modernisation of these PTT telecommunication infrastructures is necessary, in order to evolve broadband, is known as broadband (or Broad Band in English).

However, this modernization is long and complex to be implemented. In addition, there is also the interoperability problem between the two networks in order to communicate the dial-up terminals with high speed terminals and vice versa.

SUMMARY

The present invention aims to resolve all errors of the technical report. For this, the invention proposes a radio communication system enabling the interoperability between a PMR terminal which is operating on a broadband network.

Therefore, the invention helps to establish, maintain, and terminate a voice communication link and/or data between a PTT terminal (for Push To Talk) which is intended to operate on a narrowband network (or Narrow Band) and one terminal comprising PTT applications which is intended to operate on a broadband network (or broad band).

The invention is capable of operating with TETRA narrowband network infrastructures (For Terrestrial Trunked Radio) or TETRAPOL (for Terrestrial Trunked Radio Polycom) or P25 (Project 25). The invention is also capable of operating with IP-WAN Type broadband networks (Internet Protocol Wide Area Networks). IP-WAN networks means 5 networks based on the WIFI technologies (Wireless Fidelity) and/or WiMAX (Worldwide Interoperability for Microwave Access) and/or 2G (2nd Generation cellular network), and/or 3G (3rd Generation cellular network), and/or LTE (Long Term Evolution).

Therefore, the invention enables some broadband terminals to access applications or services which are normally intended for narrowband terminals. In fact, the invention enables an operating terminal over IP-WAN technologies to access some additional services, which were previously reserved only for narrowband PTT terminals. With the invention, the broadband and narrowband network infrastructures are fully interoperable. An advantage of the invention is that interoperability between narrowband and broadband network infrastructure is entirely independent of the IP-WAN terminals future development, or any other broad band radio mobile terminals technology development. The invention also helps accessing broadband terminals to narrowband services, simultaneous access to broadband services.

The invention is therefore intended for a radio communication system to Push To Talk type applications comprises:

A narrowband PMR technology terminal is capable to connect via radio electric interface to a narrowband network infrastructure which provides an access through PTT server to all narrowband PTT applications or resources, A broadband technology terminal is capable to connect via radio electric interface to IP-WAN network which provides an access through server to all broadband PTT applications or resources Wherein that, The terminal has a PTT client application over IP-WAN network which is configured to establish an IP connection through an interface between the terminal and a PTT server over IP-WAN enabling the terminal to access narrowband PTT applications or resources and to establish a communication channel with the terminal.

The invention also involves the any of the following characteristics:
the IP-WAN PTT server is capable to connect via an interface to narrowband network infrastructure PTT server and/or other IP-WAN PTT server
The interface which enables the link between the narrowband network infrastructure PTT server and IP-WAN PTT server has a gateway which helps to convert the signal from narrow band network PTT server into a operational signal for the IP-WAN PTT server and vice versa;
The network infrastructure is capable of being TETRA, or TETRAPOL, or P25 technology;
the terminal is a cellular phone equipped with a PTT client application over IP-WAN which includes a PoC client software equipped with a software component providing access to narrowband PTT services or applications, the said PoC Client is also equipped with a software component providing access to broadband PTT services or applications;
The IP-WAN PTT server has a kernel based on a PoC OMA protocol and equipped with client software.
In addition, the server includes a software component for emulating the gateway between the PTT server and the kernel;
The IP-WAN PTT server has a kernel based on a P25 protocol and equipped with client software;
The IP-WAN PTT server has a software component which enables the necessary adaptation for the operation between OMA client/server and P25 client/server, in order to enable all the common communication.
The IP-WAN PTT server is equipped with:
a first software component which emulating the access to Narrow band PTT applications or service,
second software component which emulating the access to broad band PTT applications or services.
The invention also aims a mobile terminal which having Push To Talk Type applications configured so as to operate a radio communication system according to any one of the preceding characteristics.

BRIEF DESCRIPTION OF THE FIGURES

The invention will be understood better upon reading from the following description and examining some figures which accompany it. These are presented only for illustrative purpose but not limit the invention. The figures show:

FIGS. 9a-9b: schematic representations comparing the chain management system according to an embodiment of the invention and the technical report.

DETAILED DESCRIPTION

At this stage, we note that the figures are not drawn to scale.

The following achievements are some examples. Although the description refers to one or more embodiments, this does not necessarily mean that each reference is to the same embodiment or the characteristics apply only to one embodiment. Different embodiments can also be combined with purely to provide further embodiments.

Figure 1A:
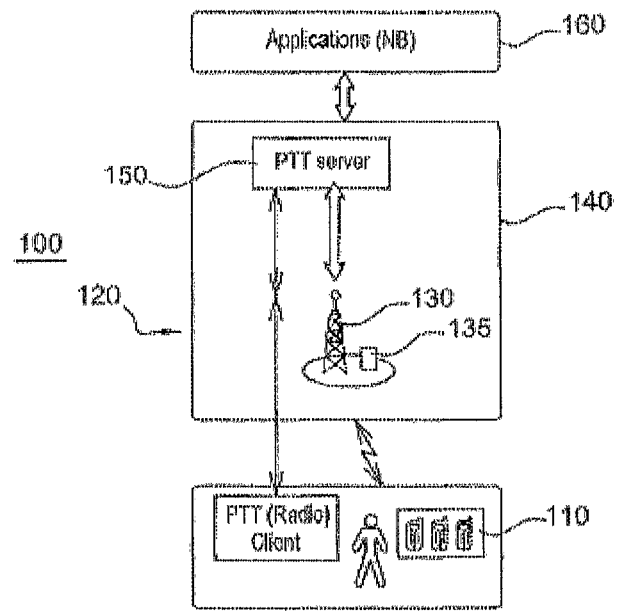
FIGS. 1a-1c: according to the technical report, schematic representations of telecommunication systems are shown; (already described)
Figure 1B:
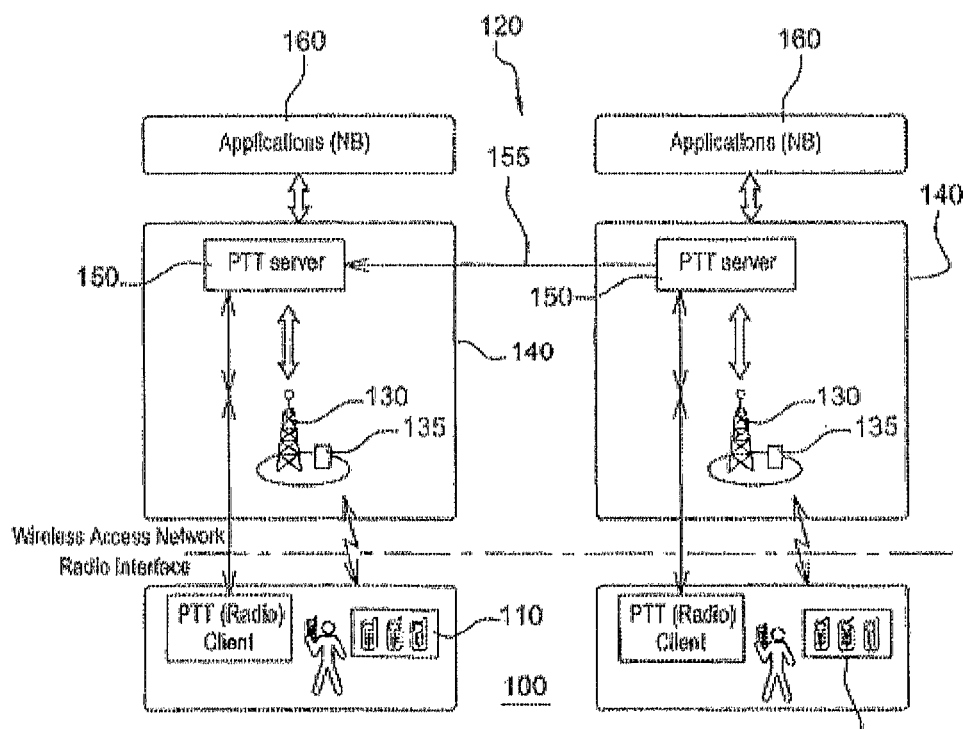
Figure 1C:
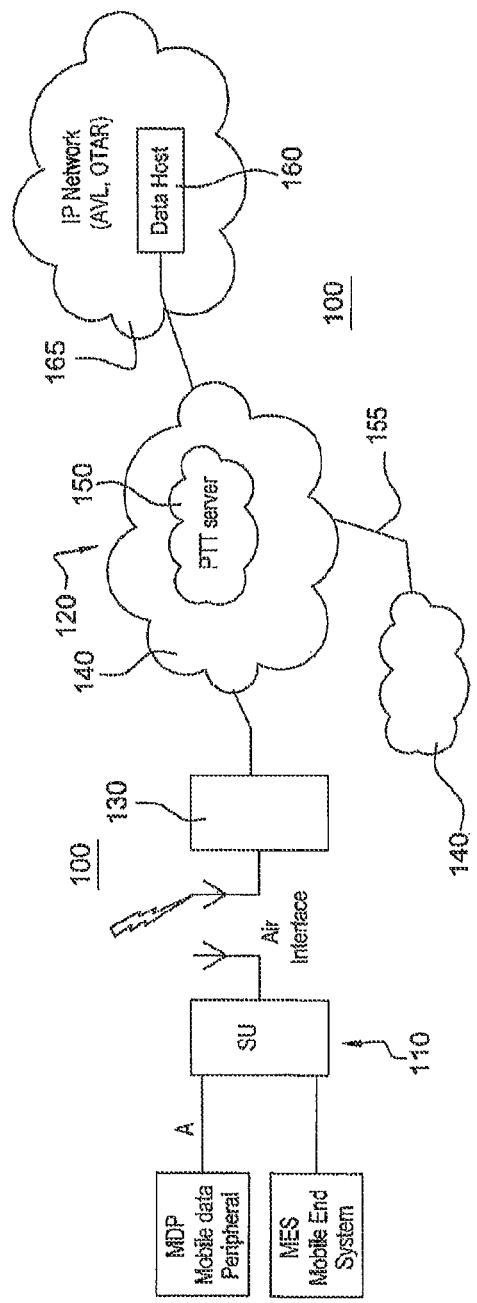
Figure 2A:
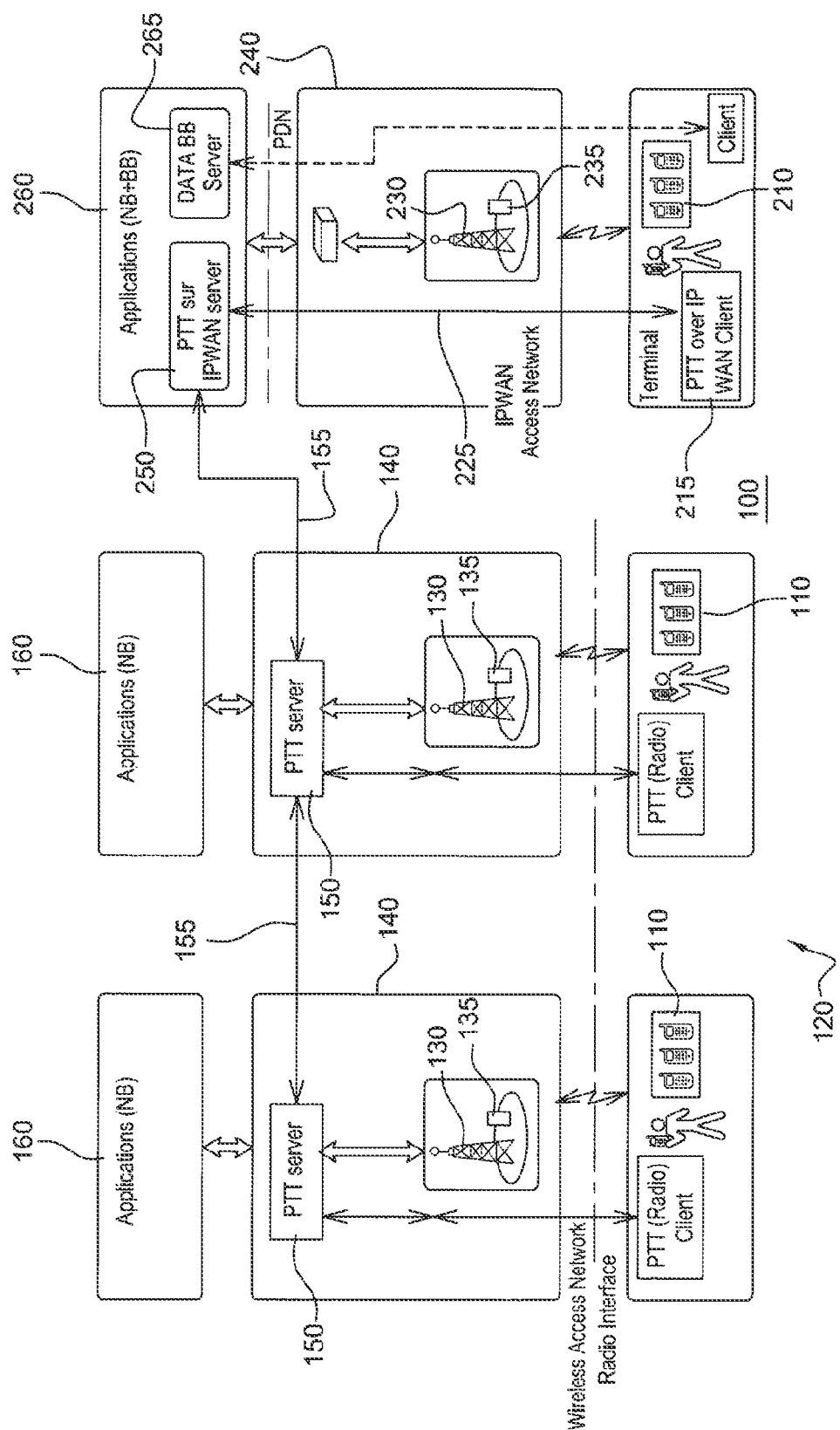
FIGS. 2a-2b: according to the embodiment of the invention, schematic representations of radio communication system are shown.
Figure 2B:
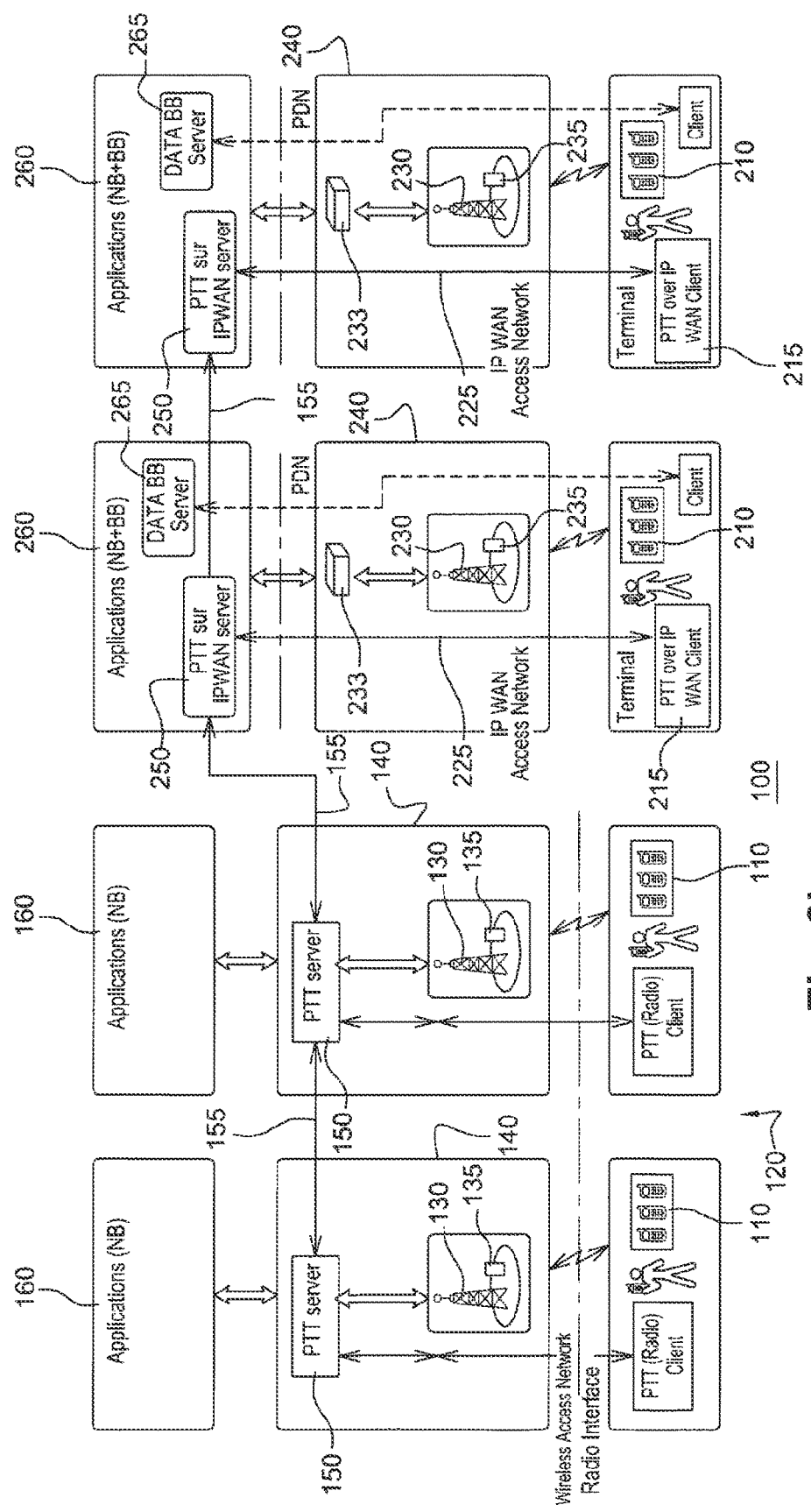
Figure 3:
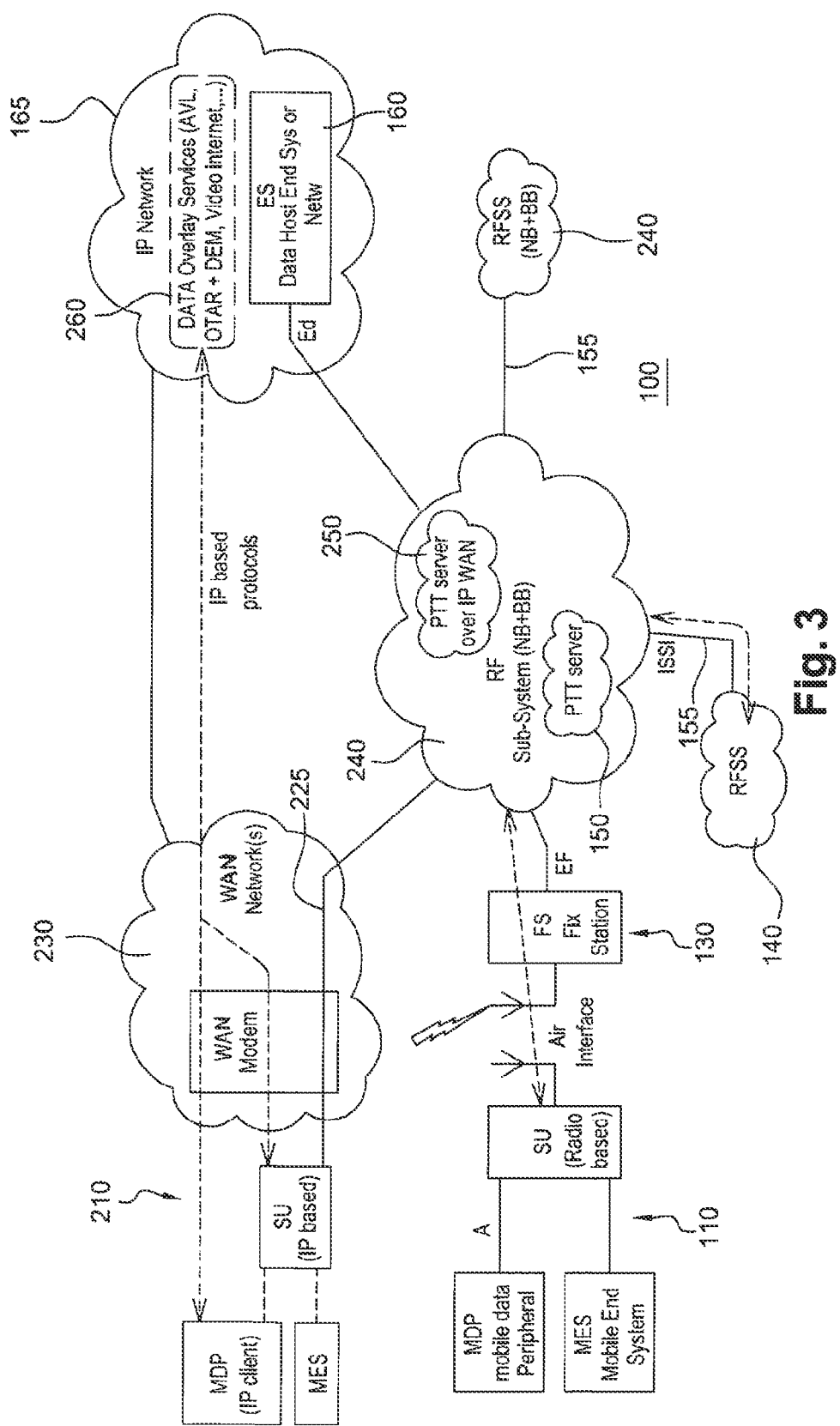
FIG. 3: according to the embodiment of the invention, operational representations of radio communication system are shown.

According to the invention, the FIG. 2a is an illustration of a PMR radio communication system. This PMR radio communication system has a PTT radio mobile terminal 110 interfaced to a network infrastructure 120 through all base stations 130. This network infrastructure 120 has all routing subsystems, also known as regional networks 140.

One can understand that it is the smallest sub-system that can provide PMR services by routing subsystem 140.

Each subsystem 140 has a switch, also known as PTT server 150 which capable of managing the mobility of terminals 110 on the network and to ensure communication between the PTT different terminals 110 of that network. The PTT server 150 is capable of connecting to other PTT servers 150 of subsystem 140 via an interface 155. As a result, the subsystems 140 are capable to connect between them so as to cover a wide geographical area. In one embodiment, the PTT server 150 is from P25 technology for Project 25. In another embodiment of the invention, the PTT server 150 is from TETRA technology (Terrestrial Trunked Radio). There is still another embodiment, the PTT server 150 is from TETRAPOL technology (TETRA POLICE).

However, the infrastructure networks 120 are not only provided for the dial-up operating terminals 110 as defined in the technical report which is also called narrowband terminal (or Narrow Band in English).

The modernization of mobile terminals 210 provides access to the network of IP-WAN technology. The objective is to improve IP-WAN technology (Wide Area Network Internet Protocol), broadband radio electric technologies or broadband such as LTE (Long Term Evolution) and/or 3G (3rd Generation cellular network), and/or 2G (2nd Generation cellular network), and/or WiMAX (Worldwide Interoperability for Microwave Access), and/or WIFI (Wireless Fidelity). Such an IP-WAN terminal 210 is capable to access the services or applications 260 such as video, Internet, e-mails, etc. . . . , and/or any other service for broadband through a BB data server 265 (for Broad Band). In the terminal operation 210 for a PMR application and based on the IP-WAN technology as shown in FIG. 2a, the terminal 210 connects to the server 265, via all base stations 230 providing access to IP-WAN network 240.

However, it would be totally impossible as things stand that a terminal 210 can establish a communication with a terminal 110, as well as having the opportunity to utilize the applications 160 for the terminals 110.

On one hand, the invention therefore provides an IP-WAN terminal 210 which includes a PTT client application 215 over the IP-WAN network and on the other hand, a server 250 is implemented so that the execution of client application 215 creates a client/server interface 225 which allowing the access to the PTT service 160 via the IP-WAN network 240.

In fact, the server 250 emulates an imitation of physical behaviour of a PTT server 150 by software which is capable to connect with a PTT real server 150 via an interface 155.

As well, the server 250 is capable to connect to one or more other servers 250 via an interface 255 as shown in the diagrams 2b and 3

As a result, the client/server interface 225 enables terminals 210 to access the applications 160 and/or applications 260 accessible via the server 265. The interface 225 also enables terminals 210 to establish a communication link with one or more terminals 110. As well, the terminals 110 are managed by means of the interface 225 to establish a communication link with one or more terminals 210. However, the terminals 110 do not have the capability to access the broad band resources or applications 260 which are accessible only by the server 265.

Figure 4:
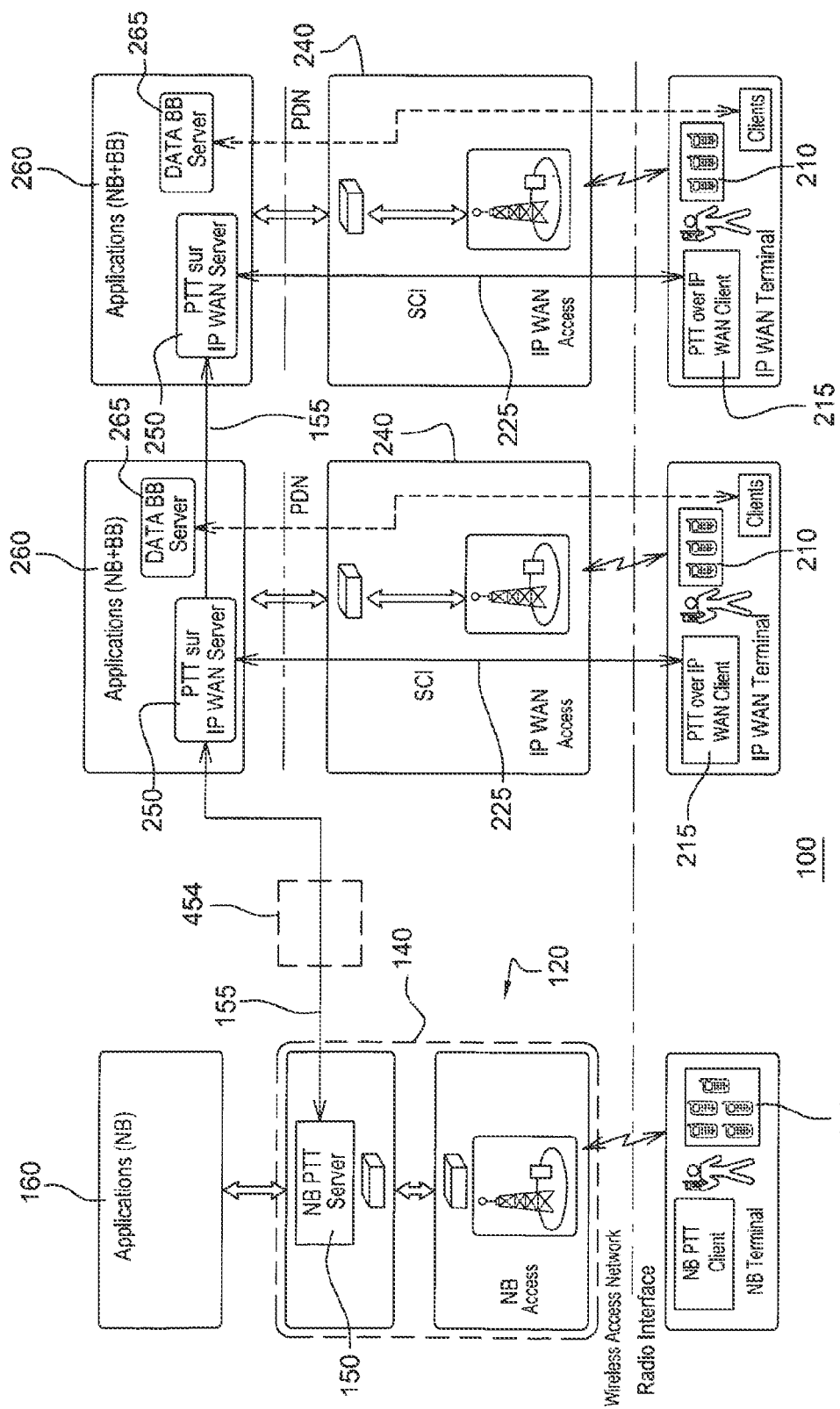
FIGS. 4-6: schematic representations of other embodiments of the invention.

The invention is capable to operate with the network infrastructure 120 of TETRA technology (for Terrestrial Trunked Radio), or TETRAPOL (for Terrestrial Trunked Radio Polycom), or P25 (for Project 25) and their respective terminals 110. Therefore, it is provided that the PTT server 150 is combined with the infrastructure technology 120 in a first embodiment. It can communicate bidirectionally with the PTT server over IP WAN via a gateway 454. This gateway 454 aims to convert the signal from the PTT server 150 into an operational signal for the PTT server over IP-WAN 250, and vice versa (see FIG. 4).

Figure 5:
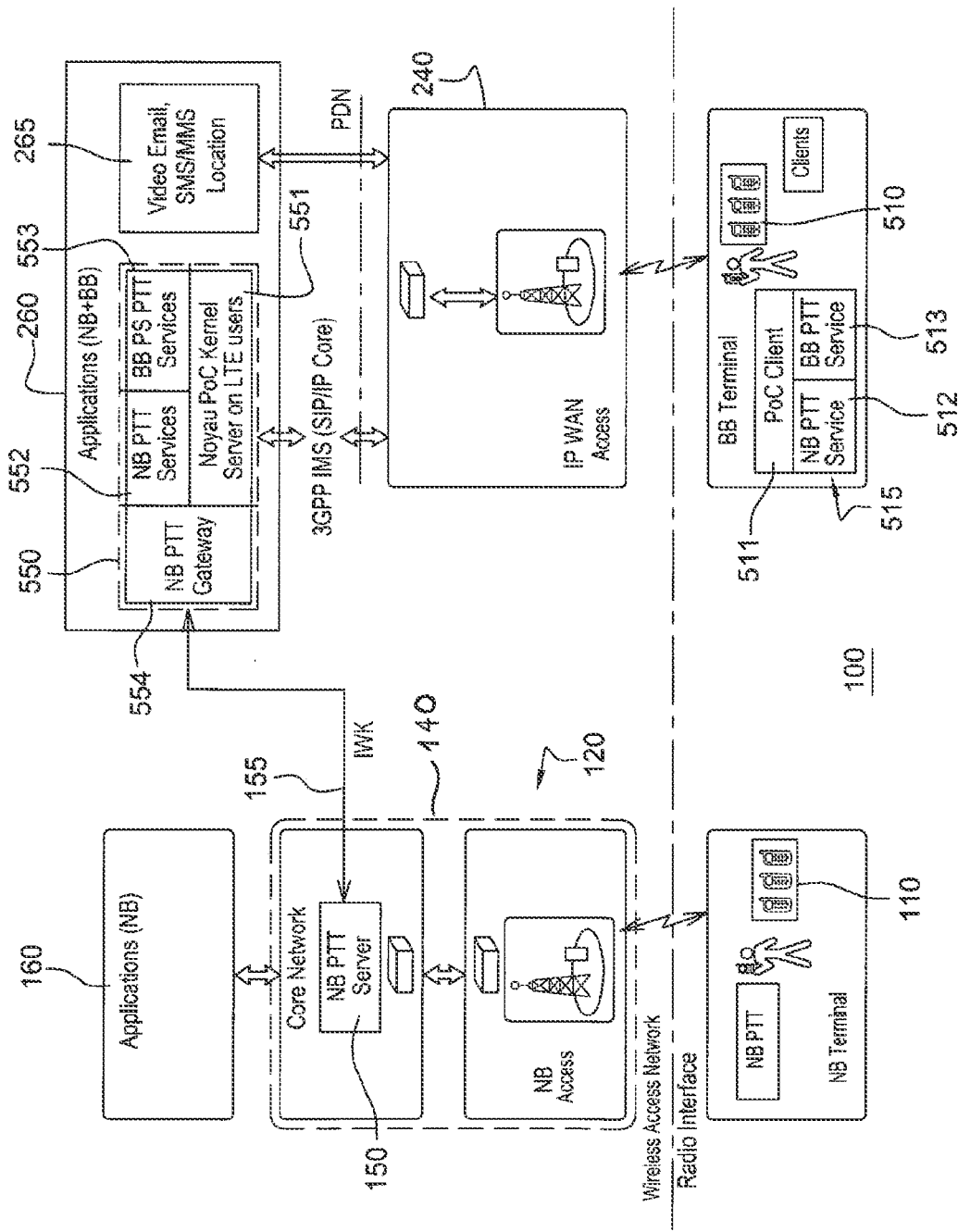

According to the invention (see FIG. 5), a user terminal 510 is a cellular phone, said mobile in another embodiment. This cell phone 510 is equipped with a PTT client application over IP-WAN which include client software on mobile phone, usually known as PoC Client (or PTT over Cellular in English).

This PTT client software 511 is equipped with a software component 512 providing access to the narrowband PTT services or applications (NB or Narrow Band in English).

As well, the client software 511 is equipped with a software component 513 providing access to the broadband PTT services or applications (BB or Broad Band in English). The client software 511 is capable to contact with server 550, having the same input/output that the server 250 as described above. The server 550 includes a PTT kernel 551 on cellular phone (or PoC Kernel in English) which is capable to operate on an IP-WAN network. This kernel 551 is equipped with a first software component 552 emulating the access to Narrow Band PTT services or applications. The kernel 551 also includes a second software component 553 emulating the access to broad band PTT services or applications. In addition, the server 550 includes a software component 554 for emulating the gateway 400 between the PTT server 150 and the kernel 551.

In fact, the cellular phone 510 is provided with PTT client software 511 over cellular phone based on the OMA standard for Open Mobile Alliance. The OMA standard is an organic standard that defines the standards for PoC networks. The PoC OMA standards were established the rule to control the initialization of the PTT calls transmission in PoC networks. In the example as shown in Mode 1 in FIG. 6, the software component 512 providing access to the narrow band PTT services or applications from P25. The software component 513 remains unchanged from that FIG. 5. According to the Mode 1, the terminal 510 therefore is capable of establishing a connection 525 via an access to the IP-WAN network 240, to the server 550 based on a PoC OMA Kernel 551. In the Mode 1, the interface 525 establishing the link between the client software 511 and the server 550 is based on the OMA PoC V2.1 Server/Client. /The software component 554 emulates a PTT gateway based on the P25 protocol and for communicating with a PTT P25 server 150. The Interface enables such interconnection is based on the P25 and is defined as an interface between sub systems, normally known as ISSI (for Inter-Sub-System Interface in English).

The ISSI interface is defined as being able to establish the rules to control the initialization of the PTT transmission calls in P25 networks. In this example the Mode 1, software component 552 is also configured to emulate the access to PTT services based on the P25.

Figure 6:
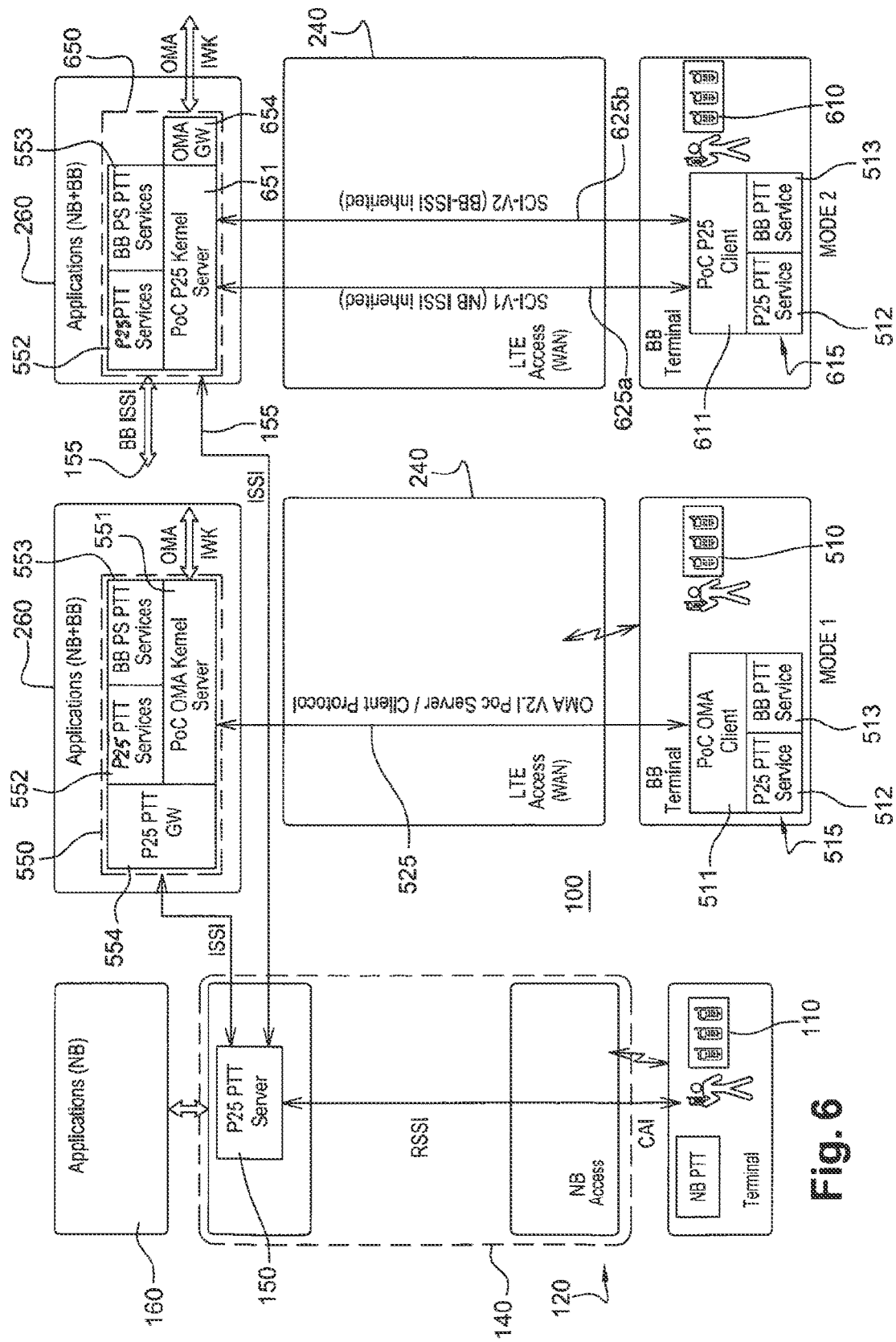
Figure 7:
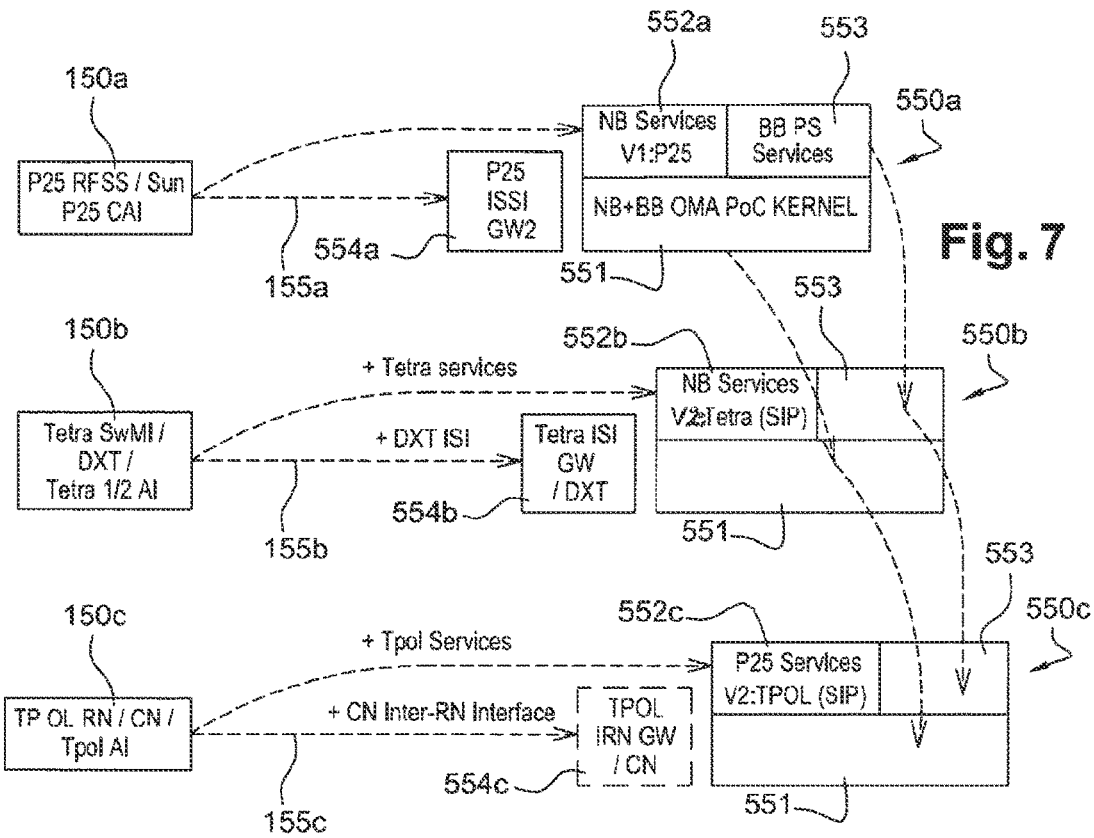
FIG. 7: according to one embodiment of the invention, all schematic representations of the system are shown, PoC P25 server running and respectively adapted to the P25, TETRA, and TETRAPOL protocols.

FIG. 7 allows us to understand the changes quickly enough to be adapted to the Mode 1 in FIG. 6 to obtain a compatible equivalent system with TETRA or TETRAPOL technologies. As seen previously, when the PTT server 150a is based on the P25. In other words, RFSS is based on the P25; the gateway 554a is based on P25 technology and is capable to be interconnected via the ISSI interface 155a. The software component 552a emulates when it comes, an access to the PTT P25 services or applications. The server 550a is based on an OMA PoC kernel 551 and enables the access via the software component 553 to the Broad band PTT services or applications.

Equivalently, when the PTT server 150b is based on the TETRA technology, i.e. the RFSS is based on the TETRA, the gateway 554b is based on the TETRA technology and is capable to be interconnected via an ISI interface 155b for inter-System-Interconnection. The software component 552b emulates an access to TETRA services or applications. The kernel 551 and the software component 553 remain when these are respectively identical to those described above.

The principle is completely identical when it comes to PTT server 150c based on the TETRAPOL technology. In other words, The RFSS is based on from TETRAPOL, the gateway 554C TETRAPOL is based on the TETRAPOL technology and is capable to interconnect via an IRN interface 155c for Inter-Regional-Network. The software component 552c emulates an access to the TETRAPOL services or applications. The kernel 551 and the software component 553 are respectively identical to those described above.

In the Mode 2 of second embodiment, the cellular phone 610 is provided with a PTT client application 615 over IP-WAN comprising a PTT client software 611 over mobile phone based on the PoC P25 standard. In the example as shown in Mode 2 of FIG. 6, the software components 512 and 513 remain respectively identical to those Mode 1. According to the mode 2, the terminal 610 therefore is capable of establishing a first 625a and a second 625B connections via an access to IP-WAN network 240, to a server 650 based on a PoC P25 kernel 651.

For what purpose is the server 650 based on a PoC P25 kernal 651? It is only because the PTT technology over P25 is natively IP (SIP/RTP) and the Broad Band data technologies such as 3G GPRS, 3G, WiMAX and WiFi are also based on the IP protocol. At the same time, the adaptations required are less complex to be implemented.

In the Mode 2, the interfaces 625a, 625B for the connection between the client software 611 and the server 650 are based on a SCI protocol (for Subscriber Client Interface). The SCI protocol inherits completely the properties of ISSI protocol, such as the SIP/RTP property over IP (for Internet Protocol). Therefore, the interface 625a is used as a narrowband transmission channel (Narrow Band) for the Server/Client protocol. Similarly, the interface 625B is used as the Broad band transmission channel (Broad Band).

The server 650, as a result of its kernel 651 is based on the PoC P25 protocol, is capable to interconnect with the PTT server 150 via an ISSI interface and without gateway. However, while interconnecting with other network elements, the server 650 server uses a software component that emulates a gateway 654 based on the OMA protocol. In fact, if one wishes to interoperate the OMA clients/server with P25 client/server in a same PTT communication, such a gateway 654 enables the necessary adaptation for the operation (or Inter-Working in English) between the two servers, to establish a common communication. The Interface enables such interconnection is based on the OMA IWK protocol (for Inter-working) The software components 552 and 553 remain respectively unchanged with that Mode 1.

Figure 8:
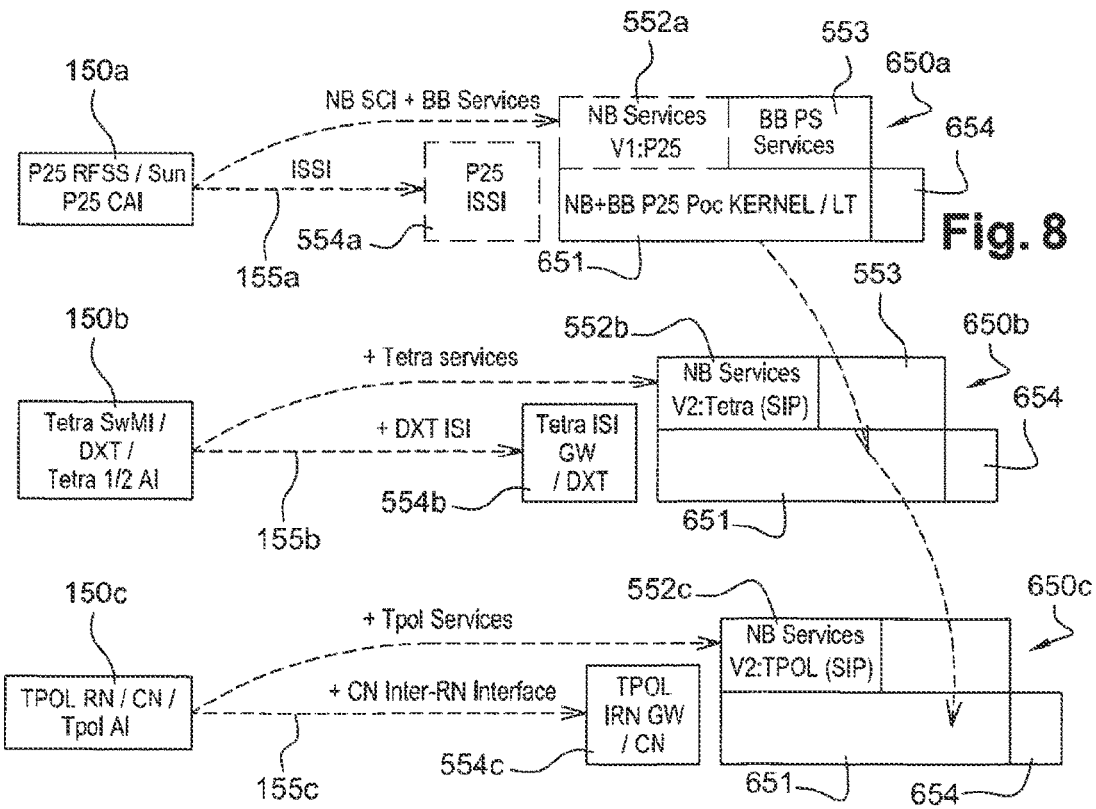
FIG. 8: according to two embodiments of the invention, all schematic representations of the system are shown, PoC P25 server running and respectively adapted to the protocols.

FIG. 8 allows you to understand the changes quickly enough to be adapted to Mode 2 in FIG. 6 and to obtain a compatible equivalent system with TETRA or TETRAPOL technologies. In fact, when the PTT server 150a is based on the P25, i.e. the RFSS is based on the P25; the gateway 554a is the based P25 technology and is capable to be interconnected via the ISSI interface 155a. The software component 552a emulates when it comes an access to PTT P25 services or applications. The server 650a is based on a kernel P25 PoC 651 and enables the access via the software component 553 to Broad Band PTT services or applications. The server 650a is capable to interconnect with other software component 654 via the gateway 654.

Equivalently, when the PTT 150b server is based on the TETRA technology, in other words, that the RFSS is based on TETRA, the gateway 554b is based on the TETRA technology and is capable to be interconnected via an ISI interface 155b (for Inter-System Interconnection). The software component 552b emulates an access to TETRA services or applications. The server 650b is based on a kernel 651 and the software components 553 and 654 remain respectively identical to those described above.

The principle is entirely identical in the case when a PTT server 150c is based on the TETRAPOL technology. In other words, RFSS is based on the TETRAPOL. The gateway 554c is based on TETRAPOL technology and is capable to interconnect via IRN interface 155c (for Inter-Regional-Network). The software component 552c emulates an access to TETRAPOL services or applications. The server 650c is based on a kernel 651 and the software components 553 and 654 remain respectively identical to those described above.

FIG. 9a shows that a PTT communication requires a shared channel to access the server. The server, when it comes, refers to a shared broadcast channel or broadcast type.

FIG. 9b shows that it achieves an equivalent system with a

PTT over IP-WAN, as there are no shared broadband data channels and an unicast connection is made between each users of the channel and the server is to manage the signalling and the media (s).

The invention claimed is:

1. A radio communication system for Push-To-Talk (PTT) type applications comprising:

a first, narrowband PMR technology terminal configured to connect via a radio electric interface to a narrowband network infrastructure which provides an access, via a PTT server, to narrowband PTT resources and applications; and a second, broadband technology terminal configured to connect connecting via the radio electric interface to an IP-WAN network which provides access, via a broadband data server, to PTT resources and applications;

wherein, the second terminal includes a PTT over IP-WAN client application, configured to establish an IP connection, via an interface, between the second terminal and a PTT over IP-WAN server allowing said second terminal to access the narrowband PTT resources and applications and to establish a communication channel with the first terminal;

wherein, the PTT over the IP-WAN server is configured to connect, via an interface, to the PTT server of the narrowband network infrastructure and to another PTT over IP-WAN server; and, wherein the second terminal is a cellular telephone provided with a PTT over IP-WAN client application which comprises a PoC client software, said PoC client software being associated with a first software component providing access to narrowband PTT services or applications and being further associated with a second software component providing access to the broadband PTT resources and applications, wherein the PTT server over IP-WAN includes a kernel based on a PoC OMA protocol and equipped with client software; and wherein the PTT server over IP-WAN includes a software component for achieving the necessary adaptation for the operation between an OMA client/server and P25 client/server, in order to achieve all common communication.

2. The radio communication system according to claim 1, wherein the interface establishes the connection between the PTT server of narrowband network infrastructure, and wherein the PTT server over IP-WAN includes a gateway, the gateway helps to convert a signal from the PTT server of narrow band network infrastructure into an operational signal for the PTT server over IP-WAN, and vice versa.

3. The radio communication according claim 1, wherein the network infrastructure is adaptable to TETRA or TETRAPOL or P25 technology.

4. The radio communication system according to claim 1, wherein the PTT server over IP-WAN further comprises a software component for emulating the gateway between the PTT server of narrow band network infrastructure and the kernel.

5. The radio communication system according to claim 1, wherein the PTT server over IP-WAN comprises a kernel based on a P25 protocol and equipped with the PoC client software.

6. The radio communication system according to claim 1, wherein the PTT server over IP-WAN is equipped with a first software component emulating the access to narrowband PTT services or applications, and a second software component emulating the access to broadband PTT services or applications.

\* \* \* \* \*